2 Sheets--Sheet 1.

SAMUEL RAY & MOSES R. SHALTERS.

Improvement in Harvesters.

No. 4,825. Reissued March 26, 1872.

Witnesses

Wm. T. Allen

Chas. Rinehart

John F. Liberling

Assignee of Sam'l Ray &

M. R. Shalters - Inventors

AM. PHOTO-LITHOGRAPHIC CO. N.Y. (OSBORNE'S PROCESS.)

2 Sheets--Sheet 2.

SAMUEL RAY & MOSES R. SHALTERS.

Improvement in Harvesters.

No. 4,825. Reissued March 26, 1872.

Witnesses:
Wm. J. Allen
Chas. Rinehart

John F. Liberling
Assignee of
Sam'l Ray &
M. R. Shalters,
Inventors.

AM. PHOTO-LITHOGRAPHIC CO. N.Y. (OSBORNE'S PROCESS.)

UNITED STATES PATENT OFFICE.

SAMUEL RAY AND MOSES R. SHALTERS, OF ALLIANCE, ASSIGNORS TO JOHN F. SEIBERLING, OF AKRON, OHIO.

IMPROVEMENT IN HARVESTERS.

Specification forming part of Letters Patent No. 23,707, dated April 19, 1859; reissue No. 2,230, dated April 17, 1866; reissue No. 4,825, dated March 26, 1872.

DIVISION B.

*To all whom it may concern:*

Be it known that SAMUEL RAY and MOSES R. SHALTERS, both of Alliance, in the county of Stark and State of Ohio, did invent certain new and useful Improvements in Mowing and Harvesting Machines; and I do hereby declare the following is a full, clear, and exact description of the same, reference being had to the accompanying drawing, in which—

Figure 1:
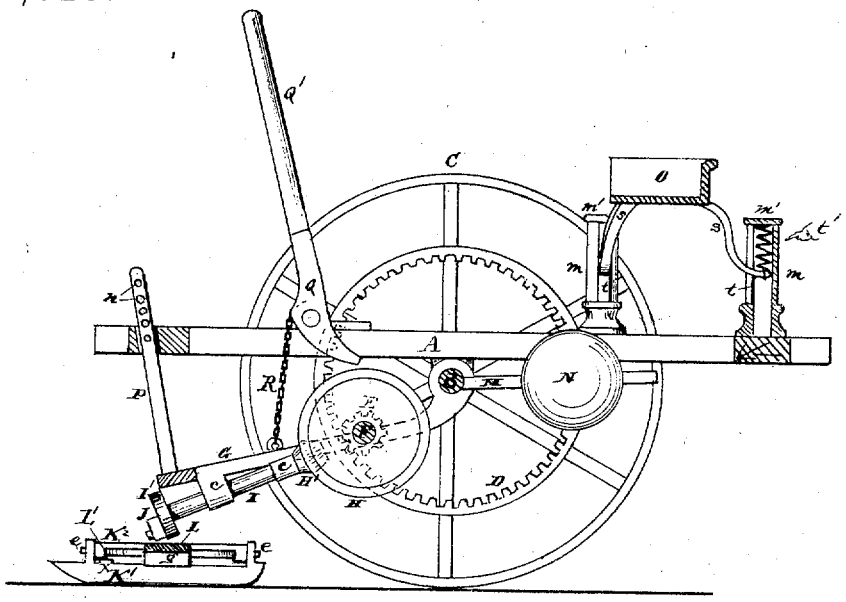
Figure 2:
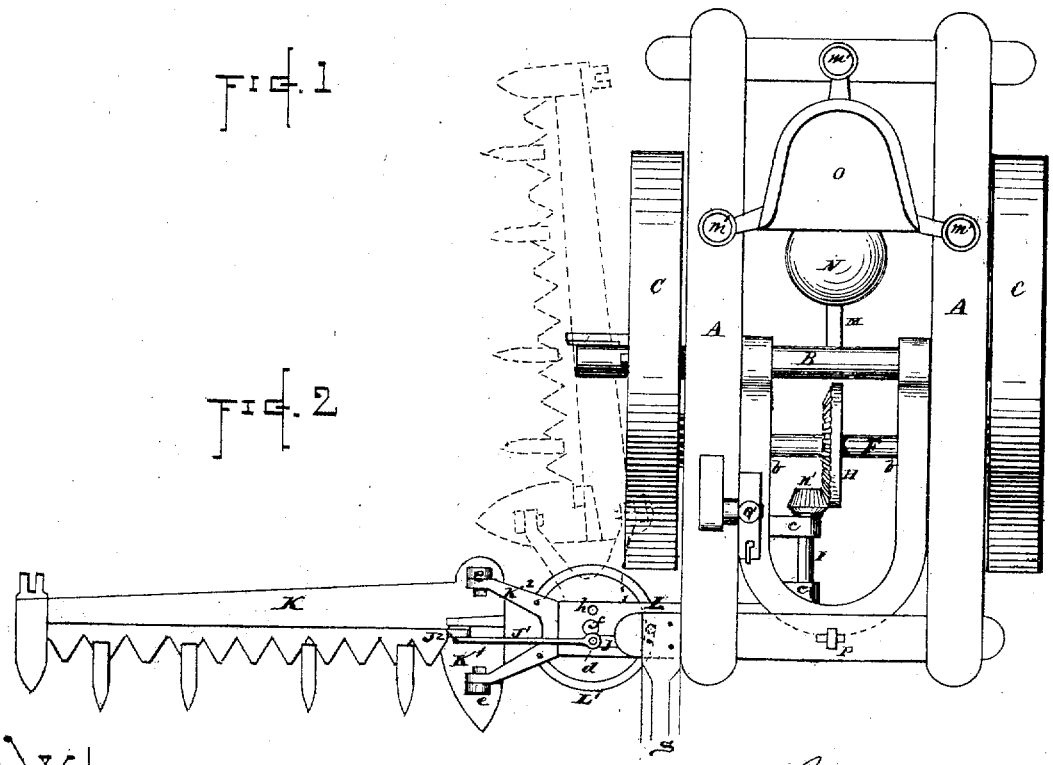
Figure 3:
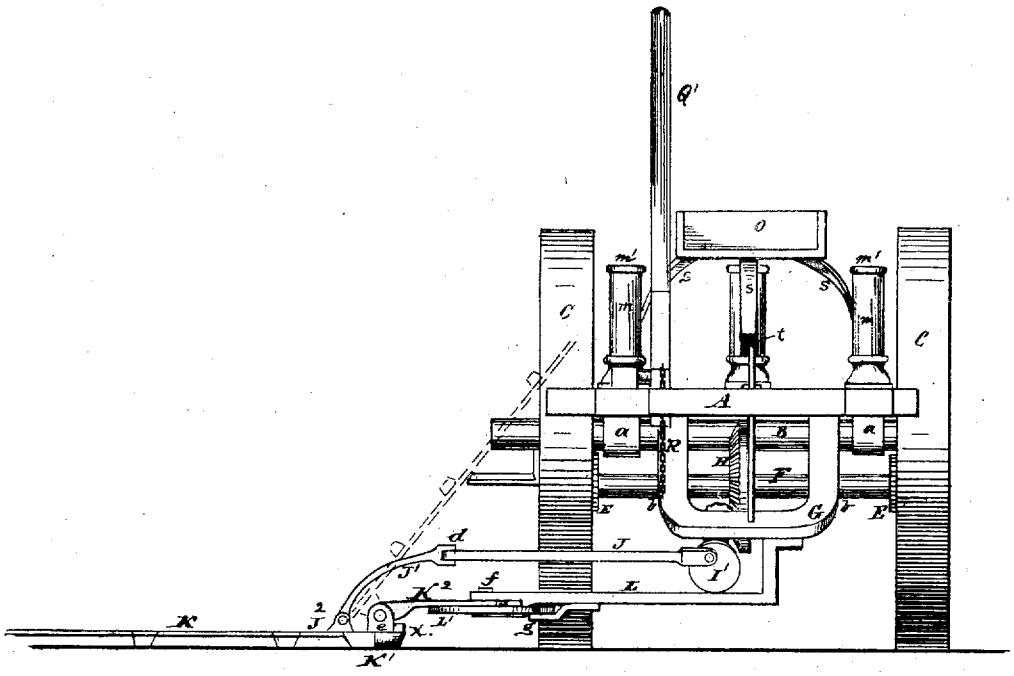
Figure 4:
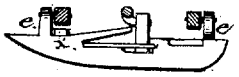

Figure 1 represents a central vertical section of a mowing or harvesting machine embracing the improvements of said RAY and SHALTERS. Fig. 2 represents a top or plan view of the same machine, the finger-beam being shown in dotted lines folded back to the rear; and Fig. 3 represents a front view of the same machine, the finger-beam being shown in dotted lines folded up. Fig. 4 represents a cross-section just inside of the shoe, which supports the heel-end of the finger-beam for the purpose of showing the stiffening-lug X, which stiffens the joint of the finger-beam when its supporting-bar is raised.

To enable others skilled in the art to which the said improvements relate, I will proceed to describe the same more in detail.

The nature of the said RAY and SHALTERS' improvements, which form the subject-matter of this division of reissue, consists in the combination, with a frame which supports the heel-end of the finger-beam, of an adjustable balance or counterpoising device, acting independently of the frame which supports the driver's seat.

In the drawing, the parts marked A represent the main frame, which vibrates freely upon the axle B, being connected thereto by loose bearings *a a*. C C are the main supporting and driving wheels, arranged one upon each end of the axle B, each wheel having an internal gear, D, attached to its inner side, and into which the small cog or spur gears E E, upon the gear-shaft F mesh. Gear-shaft F is supported and turns in bearings *b b*, attached to the bow-shaped gear-supporting frame G, the rear end of which is attached to the axle B, and its front end can vibrate up and down freely, independent of the vibratory motion of the main frame A. Near the center of the gear-shaft F is secured a bevel-gear, H, which meshes into a bevel-gear, H′, on the rear end of the crank-shaft I, which is supported and turns in bearings *c c* attached to the vibrating gear-frame G. To the front end of the crank-shaft I is attached a balance-wheel, I′, which gives motion to the pitman-rod J, which is jointed at *d*, the front part, $J^1$, of the pitman-rod being attached to the heel-end of the cutter-bar $J^2$ in the usual manner. K is the finger-beam, its shoe $K^1$ being attached by joints *e e* to the forked plate $K^2$, which is pivoted at *f* to the outer end of bar L, the inner end of which bar is securely fastened to the front end of the gear-vibrating frame G. To the under side of plate $K^2$ is fastened a supporting-ring, L′, which is sustained in a measure, as it turns with the plate $K^2$, by a hook, *g*, fastened to the under side of the bar L. When the finger-beam is in the working position a pin, *h*, is inserted into holes in the bar L and plate $K^2$, thereby locking those parts together; but when the finger-beam is to be either folded back to the rear, as shown in dotted lines, Fig. 2, or forward, pin *h* is to be removed. As, however, the invention or improvements relating to the folding of the finger-beam form the subject-matter of a separate division of reissue of even date hereof, no further description of the construction and operation of the same is here deemed necessary. A backwardly-projecting rod, M, is attached to the axle, and thus combined with the rear part of the gear-vibrating frame G, having an adjustable weight, N, to counterpoise or balance the front of the gear-frame G, the weight of the gearing thereon, and also the heel-end of the finger-beam. By moving weight N nearer to or further from the axle B, frame G can be balanced so as to cause the shoe which supports the heel-end of the finger-beam to press very lightly on the ground or stubble, and thus reduce the draft of the machine. O is the driver's seat, and has combined therewith a spiral-spring support. In this instance the seat is supported at three points, slotted tubular supports *m m m* retaining the springs and seat in place, the seat O having three guide-pieces, *s*, which pass through and work in slots *t* in the tubular supports *m* which are fastened to the top of frame A. Spiral springs *t′* are attached to caps *m′*, and also to the ends of guide-pieces *s*, whereby the driver's seat has a spiral-spring support, thus relieving, to a great degree, the driver from sudden jars and unpleasant motions of the machine while in operation. To the front of the gear-vibrating frame G is fastened an upwardly-projecting arm, P, the upper end of which passes through a mortise or slot in the main frame A, and is provided with a series of holes, *n*, whereby the operator can, by inserting a pin through one of the holes above the frame A, adjust the front of the gear-frame G and heel-end of the finger-beam at any desired distance above the ground, or so that they will not fall below a given point below the front of frame A. This is quite an advantageous arrangement, especially when the machine is working on ground cut by water, furrows, and like depressions in its surface. A lever, Q, is supported on frame A, the long arm Q′ extending up in a convenient position to be operated by the driver from his seat on the machine. The lower end of lever Q is segment-shaped, and has the upper end of chain R attached to it, the lower end of said chain being attached to frame G, whereby the driver, by drawing the upper end of lever Q back, can elevate the front of frame G as he may desire.

The machine is or may be drawn from the tongue S, attached to or near the inner corner of frame A. A section of the tongue is shown in Fig. 2. It will be observed that the tongue is attached to the front of frame A, which is free or limber—that is, can vibrate on axle B on a center independently of the vibrating gear-frame G, which can also vibrate independently of the tongue and the frame which supports the driver's seat, which is supported by the same frame to which the tongue S is attached, and consequently is controlled by the motion of the tongue, which it serves to counterbalance. It will also be noticed that the main supporting and driving wheels, with their respective internal gear-wheels, vibrating gear-frame G, main frame A, and tongue S, all have one common axis of motion—the center of axle B.

Having fully described that part of the said RAY and SHALTERS said invention or improvements which forms the subject-matter of this division of reissue, what is claimed in this division as their invention, and desired to have secured by Letters Patent, is—

The combination, with the frame which supports the gearing and heel-end of the finger-beam, of an adjustable balance or counterpoising device, acting independently of the frame which supports the driver's seat.

JOHN F. SEIBERLING.

Witnesses:
WM. T. ALLEN,
CHAS. RINEHART.